March 26, 1963 HIDEO MIYAUCHI 3,082,671
CAMERA WITH COUPLED LIGHT METER
Filed April 25, 1960 3 Sheets-Sheet 1
FIG_1
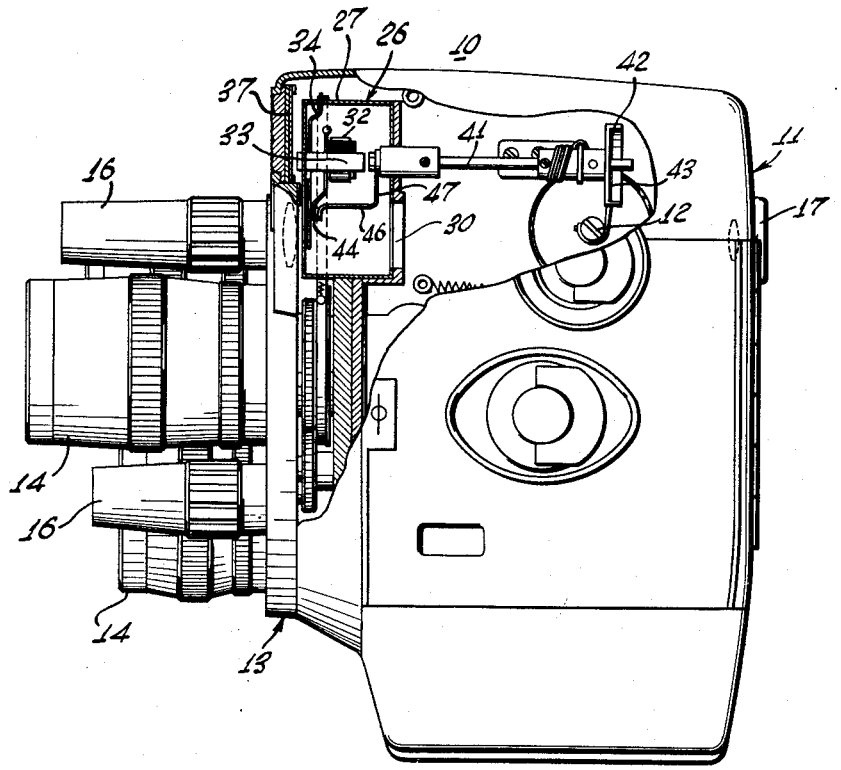
INVENTOR.
HIDEO MIYAUCHI
BY Stanley Wolder
ATTORNEY March 26, 1963 HIDEO MIYAUCHI 3,082,671
CAMERA WITH COUPLED LIGHT METER
Filed April 25, 1960 3 Sheets-Sheet 2
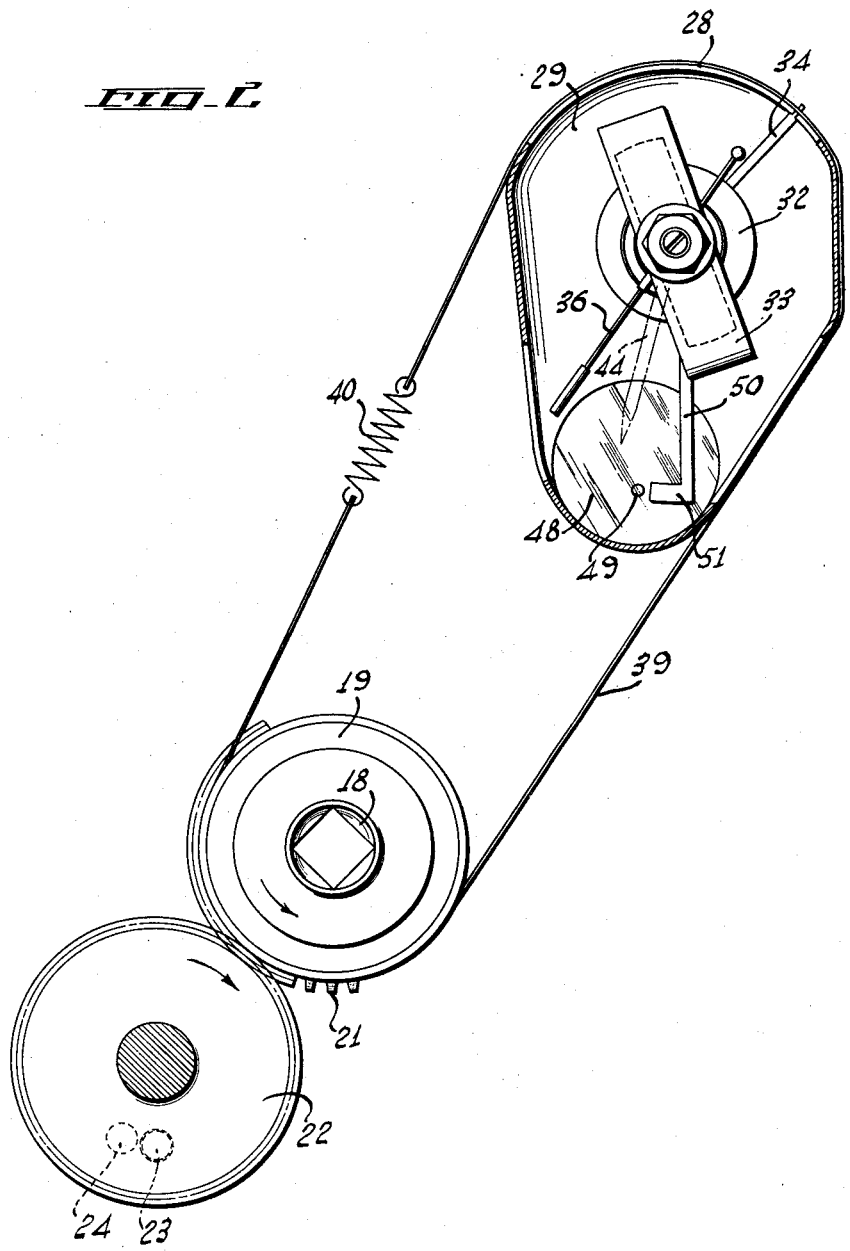

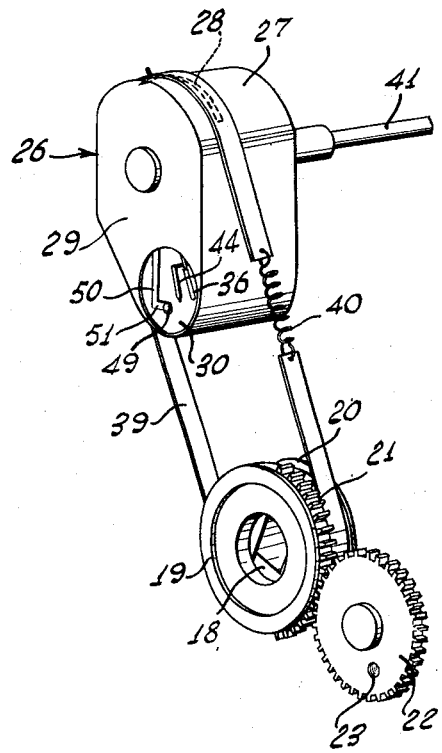
FIG_3

United States Patent Office 3,082,671
Patented Mar. 26, 1963

3,082,671
CAMERA WITH COUPLED LIGHT METER
Hideo Miyauchi, Nagano-ken, Japan, assignor to Yashica Co., Ltd., Tokyo, Japan, a corporation of Japan
Filed Apr. 25, 1960, Ser. No. 24,341
Claims priority, application Japan May 4, 1959
3 Claims. (Cl. 95—10)

The present invention relates generally to improvements in photographic cameras and it relates more particularly to an improved photographic camera of the type provided with a coupled photoelectric exposure meter.

In the photographic art, to effect the proper exposure of the film it is necessary to accurately correlate the film speed, the shutter speed, the lens aperture and the lighting conditions whereby the light incident on the film falls within a desired range. The only variable which must be repeatedly determined is the light conditions since the film speed rating is known and the shutter speed and lens opening are adjustable. While the light conditions may be readily determined by the use of a photoelectric exposure meter, its correlation with the film speed and the ascertaining of the proper lens aperture and shutter speed and corresponding adjustments thereof require a degree of skill not normally possessed by the average amateur photographer. To remedy this, cameras have been provided in which the photoelectric exposure meter has either automatically adjusted the diaphragm in accordance with the light conditions and the lens aperture and film speed rating or has been coupled to the lens diaphragm control member and shutter speed control member whereby the proper correlation of the variables is indicated by the lining up of the exposure meter pointer with a variable index member. It is to this latter type of camera that the present invention relates. Conventionally the camera having a coupled photoelectric exposure meter is provided with a rheostat connected in series with the electric meter and varied with the lens opening or a mask movable across the face of the photoelectric cell in accordance with the lens opening or a complex mechanical coupling and gearing arrangement. These systems possess many drawbacks and disadvantages. They are relatively complex and expensive and are subject to frequent malfunctioning and loss of accuracy.

It is therefore a principal object of the present invention to provide an improved photographic camera.

Another object of the present invention is to provide an improved photographic camera having a coupled photoelectric exposure meter.

Still another object of the present invention is to provide an improved camera having a completely mechanically coupled exposure meter in which the electrical and light responsive characteristics of the meter are invariable.

A further object of the present invention is to provide an improved motion picture camera having a coupled photoelectric exposure meter which facilitates the production of fade sequences.

Still a further object of the present invention is to provide an improved camera of the above nature characterized by its simplicity, ruggedness, accuracy and low cost.

The above and other objects of the present invention will become apparent from a reading of the following description taken in conjunction with the accompanying drawings wherein:

FIGURE 1 is a side elevational view of a motion picture camera embodying the present invention, illustrated partially broken away and partially in section.

FIGURE 2 is an enlarged detailed rear elevational view of the coupled electric meter and the lens diaphragm adjusting system; and FIGURE 3 is a front perspective view thereof.

In a sense the present invention contemplates the provision of a camera comprising a photoelectric exposure meter including a current meter having an indicator element, an index element viewable with said indicator element, means varying the position of said meter in accordance with an operating parameter of said camera and means varying the position of said index element in accordance with another operating parameter of said camera.

In accordance with a preferred form of the present invention, the current meter includes a magnetic yoke or frame and a swingable armature carrying an indicator element needle which is swingable therewith, the meter assembly being adjustably rockable in a housing having an aperture formed therein through which the indicator needle is viewable. The camera diaphragm is adjustable by way of a ring which includes a pulley section. A tensioned belt engages the pulley section and passes around the meter casing, engaging an arm projecting from the meter through a slot in the casing so that rotation of the pulley, accompanying an adjustment of the diaphragm, varies the angular position of the meter assembly. The index element extends radially from a shaft which is coupled to the shutter speed adjusting member of the camera. The indicator and index elements are observable through the camera view finder. It can be seen from the above that the diaphragm aperture, shutter speed and light conditions are simply and automatically correlated. The position of the indicator needle is varied relative to the meter in accordance with the light incident upon the connected photoelectric cell and the position of the meter and hence the absolute position of the indicator needle is varied in accordance with the diaphragm opening. The position of the index needle is varied in accordance with the shutter speed, and also, in the manner set forth in the copending patent application Serial No. 6,157, filed February 2, 1960, in the name of Niro Akahane, now United States Patent No. 3,044,383, granted July 17, 1962, in accordance with the film speed rating. Thus by proper calibration, in the manner well known in the art, whenever the indicator and index elements are in registry, the film will be properly exposed. In order to expedite the taking of fade sequences in a motion picture camera embodying the above mechanism means are provided which afford an indication of a fully closed diaphragm and permit the full closing of the diaphragm. Means may also be provided affording an indication of too little or too much available light for the preset shutter speed and the available lens apertures.

Referring now to the drawings which illustrate a preferred embodiment of the present invention, the reference numeral 10 generally designates a motion picture camera incorporating the subject improved mechanism and including a body member or casing 11 which houses the conventional variable speed shutter mechanism and film winding arrangement. The speed of the shutter is adjustable by way of a shaft 12 which is manipulated by an externally mounted first knob associated with which is a second concentric knob. The first and second knobs are calibrated in accordance with film speed ratings and shutter speeds and are mechanically coupled as described in the above identified copending patent application Serial No. 6,157 the combined movement of the knobs adjusting the shaft 12 accordingly.

Mounted on the front face of the body member 11 is a multibarrel turret head 13 including a plurality of main lenses 14 and matching view finder objective lenses 16.

As the lenses 14 are brought into registry with the camera picture axis the corresponding lenses 16 are brought into alignment with the view finder eye piece 17 disposed on the rear wall of the casing 11 and being in optical communication with the aligned objective lens 16 through the casing 11. Located along the optical axis of the camera 10 and in the casing 11 behind the lens 14 is an adjustable diaphragm 18 the aperture or opening of which is varied by the rotation of a control ring 19. The rear section 20 of the ring 19 is provided with a peripheral groove to define a pulley rotatable with the ring 19. Extending along the circumference of the ring 19 is a rack 21 which is engaged by a finger control wheel defining gear 22 rotatably mounted in the casing 11 and having an edge thereof projecting outside the casing to permit its manipulation and hence adjustment of the diaphragm aperture. A detent 23 is located on the front face of the wheel 22 and releasably engages a recess 24 formed in a confronting wall when the diaphragm 18 is completely closed.

Disposed in the upper front section of the camera casing 11 is a meter housing 26 including a cylindrical top wall 27 having a peripheral slot 28 formed therein and front and rear walls 29 having apertures 30 formed therein aligned with the optical axis of the view finder. Located in the housing 26 and rotatable about a longitudinal axis is a sensitive electric current meter 32 including a magnetic yoke or magnet carrying frame member 33 suitably journalled to the housing front wall 29. Projecting from the frame 33 is an arm 34 which projects through the slot 28 and is swingable with the meter 32.

An armature or swinging coil is rotatably associated with the yoke 33 and carries an indicator element or needle 36 the free end of which moves across the field of view between the apertures 30. The meter 32 is electrically connected to a photoelectric cell 37 mounted on the front face of the camera casing 11. Registering with the pulley 20 is a flexible belt 39 which slidably extends about the cylindrical surface 27 and is provided with an aperture which engages the free end of the arm 34. The opposite ends of the belt 39 are connected by a helical tension spring 40 which maintains the belt 39 taut while permitting the stretching thereof. With the above arrangement, the angular position of the meter 32 varies with the aperture of the diaphragm 18 and the angular position of the needle 36 relative to the meter 32 varies with the light incident on the photoelectric cell 37. Thus the absolute position of the needle 36 varies in accordance with the diaphragm aperture and light conditions. It should be noted that the clockwise rotation of the ring 19, as viewed in FIGURE 2 of the drawing, effects the closing of the diaphragm 18 and the swinging of the meter 32 clockwise and vice versa. Furthermore, the needle 36 swings relative to the diaphragm, clockwise with increased light upon the photocell 37 and counterclockwise with decreased light.

A shaft 41 extends longitudinally and rearwardly from the meter 32 and is coaxial therewith and suitably journalled in the camera casing 11. The forward end of the shaft 41 projects into the meter housing 26 and has a pulley 42 affixed to its trailing end. The pulley 42 is coupled to the control shaft 12 by way of a resilient flexible band 43 so that rotation of the shaft 12 rotates the shaft 41. Mounted on the leading end of the shaft 41 within the housing 26 is an index element or needle 44 having a radially projecting free end movable in a path concentric with that of the indicator needle 36 and directly behind the needle 36 and across the area of view through the apertures 30. The needle 44 includes a longitudinally extending arm 46 terminating at its inner end with a radially projecting arm 47 connected to the shaft 41. It should be noted that the control knobs rotating the shaft 12 are so coupled and calibrated that the index needle 44 swings clockwise with greater shutter speeds and lower film speed ratings and counterclockwise with lower shutter speeds and higher film speed ratings.

A transparent disc 48 registers with the housing front aperture 30, and carries an indicia element or dot 49. Projecting from the meter frame 33 is an arm 50 terminating in a masking element 51 which is movable across the dot 49. The leading edge of the masking element 51 registers with the dot 49 when the diaphragm is at maximum opening. Thus when the dot 49 is masked the available light is insufficient for maximum lens opening. An opposite arm may be provided to afford an indication through the view finder of the closing of the opening of the diaphragm 18. It should be noted that the meter 32 is swingable in a limited arc as determined by the length of the slot 28 thereby limiting the movement of the arm 34, the ends of the meter swing corresponding to the maximum and minimum photographing openings of the diaphragm 18. Moreover, the diaphragm 18 can be completely closed by further rotation of the ring 19 by way of the wheel 22, such further movement being permitted by the stretching of the spring 40.

In employing the improved camera the operator adjusts the shutter speed and film speed rating knobs to the preselected values thereby to effect the positioning of the index element 44 in the manner above set forth. The operator then views the subject through the view finder, sighting the needles 36 and 44 and dot 41 and masking element 51. The wheel 22 is then manipulated to rotate the ring 19 and adjust the diaphragm 18 and concurrently swing the meter 32 with the indicator needle 36 until it is in alignment with the index needle 44. At this point the diaphragm aperture, light conditions, shutter speed and film speed are properly correlated and the shutter may be actuated to effect the exposure of the film. If the mask 51 covers the dot 49 the light is insufficient and the shutter should not normally be operated.

To effect a fade out sequence the operator, at the termination of the normal picture sequence merely slowly rotates the wheel 22 in a direction to completely close the diaphragm as indicated by the click when the detent 23 registers with the aperture 24, at which time the shutter is stopped. To produce a fade in sequence, the shutter operation is started with the diaphragm closed, and the diaphragm is slowly opened by manipulating the wheel 22 until the needles 36 and 44 are in registry at which position of the diaphragm the shutter operation is continued.

While there has been described and illustrated a preferred embodiment of the present invention it is apparent that numerous alterations and omissions may be made without departing from the spirit thereof as defined by the claims.

What is claimed is:

1. A photographic camera comprising a diaphragm adjusting member, a shutter adjusting member, a photosensitive member, a current meter connected to said photosensitive member and including an indicator element swingable along a first path in accordance with the light incident upon said photosensitive element, an index element movable along a second path visually coordinated with said first path whereby to permit visual registry of said indicator element and said index element, means motivated with one of said adjusting members to correspondingly rotate said meter and swing said indicator element along said first path, said meter rotating means including a pulley rotatable with said diaphragm adjusting member, a member projecting radially from said meter, an endless belt engaging said pulley and said radially projecting arm, and means motivated with the other of said adjusting members to vary the position of said index element along said second path.

2. A camera in accordance with claim 1 including a housing enclosing said meter and having a cylindrical upper wall provided with a peripheral slot through which said radially projecting arm extends, said belt slidably engaging said cylindrical wall.

3. A camera in accordance with claim 1 wherein said belt is resiliently extensible to permit the rotation of said pulley beyond the terminus of rotation of said meter.

References Cited in the file of this patent

UNITED STATES PATENTS

| | | |
|---|---|---|
| 2,518,717 | Rath | Aug. 15, 1950 |
| 2,956,492 | Quick | Oct. 18, 1960 |

FOREIGN PATENTS

| | | |
|---|---|---|
| 522,919 | Great Britain | July 1, 1940 |
| 868,632 | France | Oct. 13, 1941 |
| 747,251 | Germany | Sept. 18, 1944 |
| 848,425 | Germany | Sept. 4, 1952 |
| 202,437 | Austria | Mar. 10, 1959 |